(12) United States Patent
Nickeas et al.

(10) Patent No.: US 7,287,404 B2
(45) Date of Patent: Oct. 30, 2007

(54) SECURITY DEVICE FOR A THREADED ELEMENT

(75) Inventors: Mark Nickeas, Lake Sherwood, CA (US); Martin Nickeas, Oxnard, CA (US)

(73) Assignee: Flow Security Systems, Inc., Camarillo, CA (US)

( * ) Notice: Subject to any disclaimer, the term of this patent is extended or adjusted under 35 U.S.C. 154(b) by 0 days.

(21) Appl. No.: 11/164,876

(22) Filed: Dec. 8, 2005

(65) Prior Publication Data

US 2006/0130544 A1 Jun. 22, 2006

Related U.S. Application Data

(60) Provisional application No. 60/634,340, filed on Dec. 8, 2004.

(51) Int. Cl.
*B65D 55/14* (2006.01)
*F16K 35/00* (2006.01)

(52) U.S. Cl. .............. 70/163; 70/176; 70/232; 70/179; 215/207; 220/210; 137/382

(58) Field of Classification Search .......... 70/163–165, 70/175–179, 230, 232, 229, 244, DIG. 57, 70/416–417; 137/382; 411/910; 220/210; 215/207

See application file for complete search history.

(56) References Cited

U.S. PATENT DOCUMENTS

| 1,625,901 | A | * | 4/1927 | Lay | 70/232 |
| 1,702,205 | A | * | 2/1929 | Freedman | 70/165 |
| 1,702,532 | A | * | 2/1929 | Boomer et al. | 220/210 |
| 3,426,932 | A | * | 2/1969 | Rouse | 215/207 |
| 3,605,460 | A | * | 9/1971 | Singer et al. | 70/232 |
| 3,748,879 | A | * | 7/1973 | Singer et al. | 70/232 |
| 3,817,065 | A | * | 6/1974 | Sander | 70/232 |
| 4,122,695 | A | * | 10/1978 | Hall | 70/417 |
| 4,984,698 | A | * | 1/1991 | Stuckey | 215/207 |

* cited by examiner

*Primary Examiner*—Suzanne Dino Barrett
(74) *Attorney, Agent, or Firm*—Koppel, Patrick, Heybl & Dawson; Michael J. Ram

(57) ABSTRACT

A security device for engaging an threaded element includes an inner body configured to engage the threaded element and an outer body operatively coupled to the inner body. A lock is configured to engage the outer body and is operable such that the outer body moves with the inner body when the lock is in an extended configuration and freely rotates relative to the inner body when the lock is in a retracted configuration.

16 Claims, 3 Drawing Sheets

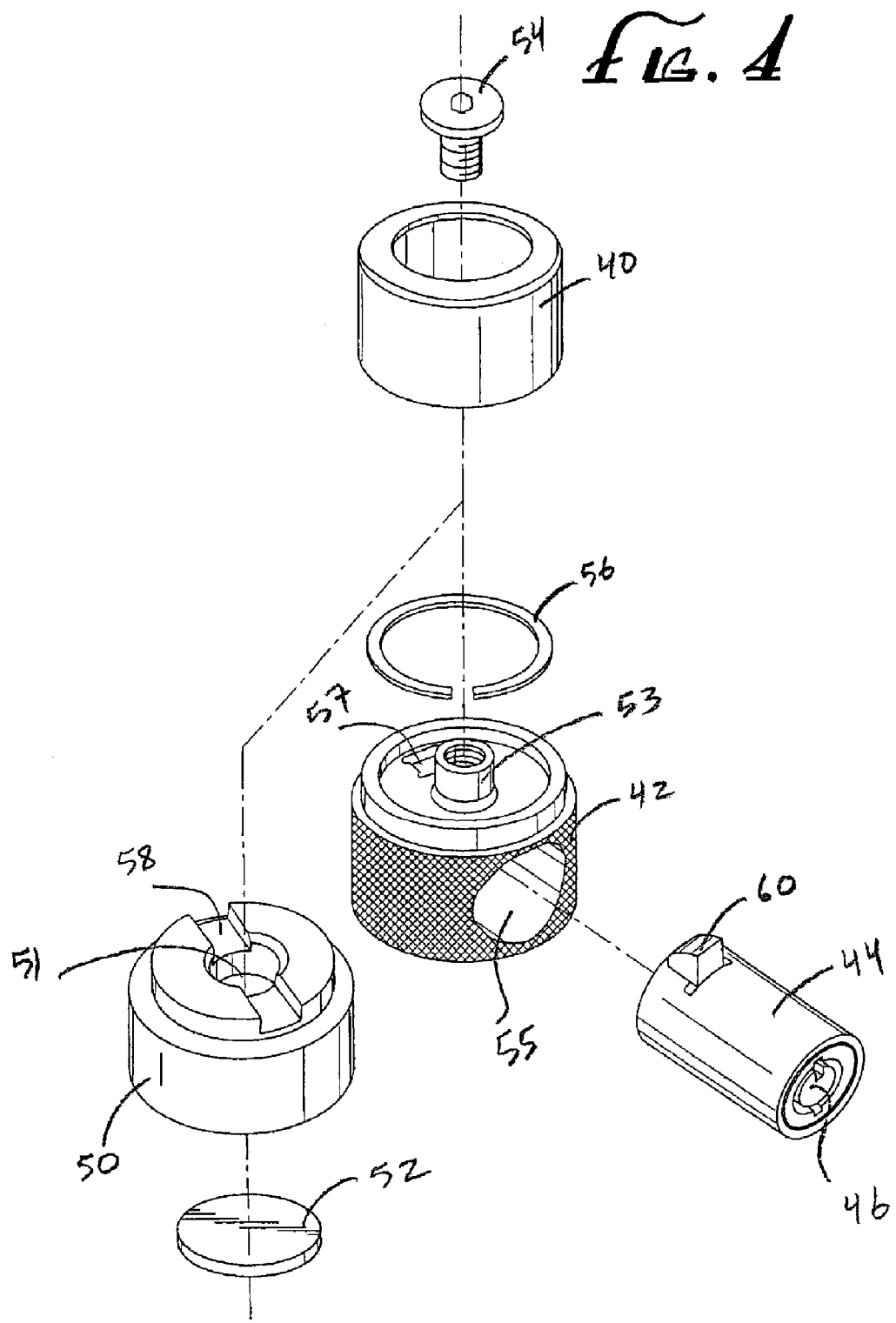

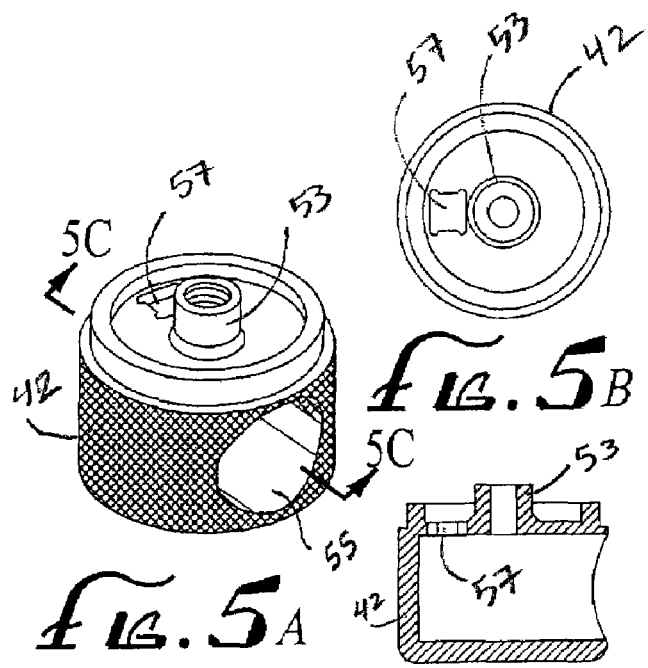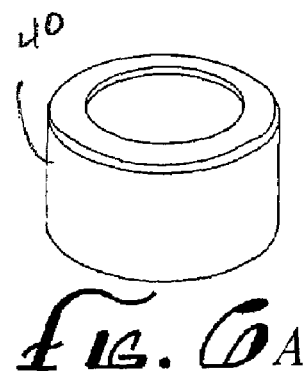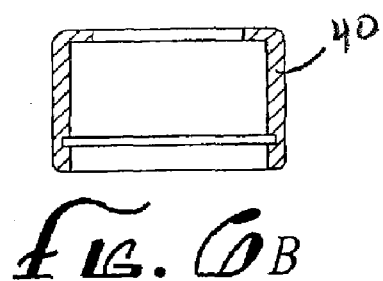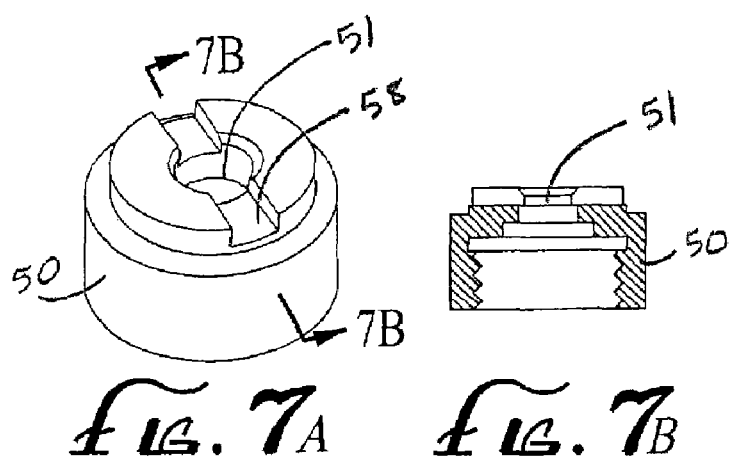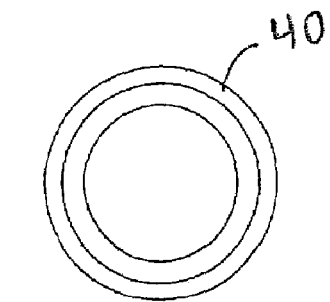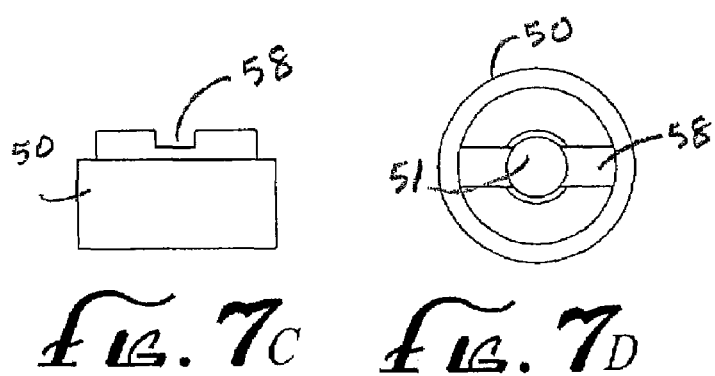

SECURITY DEVICE FOR A THREADED ELEMENT

RELATED APPLICATION

The present application claims the benefit of provisional patent application Ser. No. 60/634,340, filed Dec. 8, 2004.

BACKGROUND

The present disclosure generally relates to locks, and more particularly, to a security device for engaging a threaded element to prevent unauthorized access thereto, regardless whether the threaded element is a port of a fluid passageway, a control, or any other similar or like configured device or assembly.

Conventional locking devices for threaded elements have several disadvantages. One prominent disadvantage is that conventional locking devices attempt to rigidly secure the threaded element. However, this subjects the locking device to abuse and malfeasance because tools or other implements may be used to gain leverage or other advantage on the locking device. As a result, such conventional locking devices can often be easily defeated and removed by the application of brute force.

Therefore, there exists a need in the art for a security device for threaded elements that overcomes the disadvantages of the conventional devices, is inexpensive to manufacture and is easy to assemble and operate.

BRIEF DESCRIPTION OF THE DRAWINGS

Certain embodiments are shown in the drawings. However, it is understood that the present disclosure is not limited to the arrangements and instrumentality shown in the attached drawings.

FIG. 4 is an exploded view of the security device of FIG. 1.

FIG. 5A is a perspective view of an outer body of the security device of FIG. 1.

FIG. 5B is a top view of the outer body of FIG. 5A.

FIG. 5C is a partial cross sectional view of the outer body of FIG. 5A taken at sectional line 5C-5C of FIG. 5A.

FIG. 6A is a perspective view of a free spinning cover of the security device of FIG. 1.

FIG. 6B is a side cross sectional view of the free spinning cover of FIG. 6A.

FIG. 6C is a top view of the free spinning cover of FIG. 6A.

FIG. 7A is a perspective view of a inner body of the security device of FIG. 1.

FIG. 7B is a partial cross sectional view of the inner body of FIG. 7A taken at sectional line 7B-7B of FIG. 7A.

FIG. 7C is a side view of the inner body of FIG. 7A.

FIG. 7D is a top view of the inner body of FIG. 7A.

SUMMARY

Figure 1:
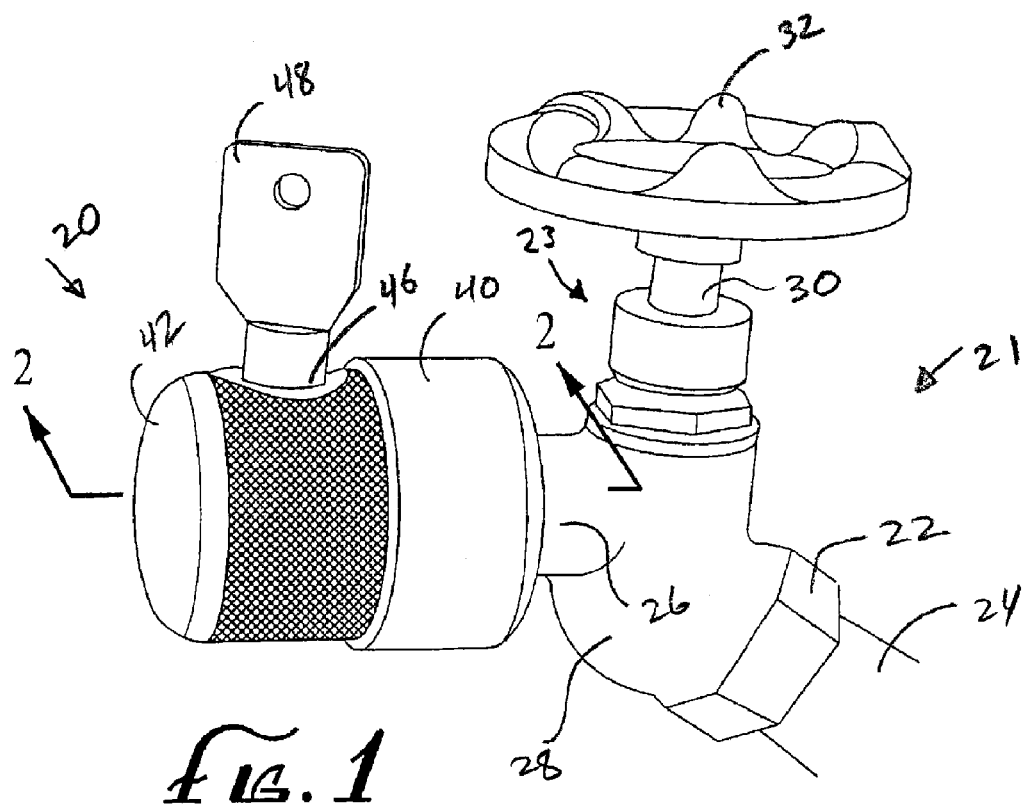
FIG. 1 is a perspective view of a security device constructed in accordance with the teachings of the present invention.

In accordance with one principal aspect of the present disclosure, a security device for engaging an threaded element includes an inner body configured to engage the threaded element and an outer body operatively coupled to the inner body. A lock is configured to engage the outer body and is operable such that the outer body moves with the inner body when the lock is in an extended configuration and freely rotates relative to the inner body when the lock is in a retracted configuration.

DETAILED DESCRIPTION OF THE DISCLOSURE

For the purposes of promoting and understanding the principles disclosed herein, reference will now be made to the preferred embodiments illustrated in the drawings and specific language will be used to describe the same. It will nevertheless be understood that no limitation of the scope is thereby intended. Such alterations and further modifications in the illustrated device and such further applications are the principles disclosed as illustrated therein as being contemplated as would normally occur to one skilled in the art to which this disclosure relates.

Referring to FIG. 1, a security device 20 constructed in accordance with the teachings of one embodiment of the present disclosure is shown connected to a threaded element 21, which in one embodiment may be configured as an port for a fluid passageway commonly disposed on an exterior of a structure, also commonly known as a hose bib or may be configured as a control 23, such as in one embodiment the valve control for the hose bib. Although the security device 20 is shown in FIG. 1 to be connected to the hose bib, as will become apparent from the following, the security device 20 is connectable to any threaded element, port or control to prevent unauthorized access. It is also within the teachings of the present disclosure that the threaded element as described herein is not in a limiting sense. Rather, any port, control or other similar or like device, assembly, element or structure to which access is to be limited shall be considered within the threaded element expression.

In one embodiment, the hose bib 21 includes an inlet 22 that is attached to a waterline 24, from which the inlet 22 receives water. The hose bib 21 also includes an port 26 from which the water can eject. Disposed between the inlet 22 and the port 26 is a ball valve 28 that controls the flow of water from the inlet 22 to the port 26. The ball valve 28 includes a valve stem 30 that extends upward through the body of the hose bib 21. A handle 32 is attached to the valve stem 30 so that a user can control the ball valve 28, thereby controlling the flow of water between the inlet 22 and the port 26 (i.e., turning on or shutting off the water).

The security device 20 may be connected to the port 26 by being screwed or other suitable connection method onto the port 26. The security device 20 may include an inner body 50, an outer body 42 and a free spinning cover 40. The security device 20 may further include a lock 44 having a key opening 46 and a key 48 that operates the lock 44.

As will be described in detail in the following, when the security device 20 is configured in a secured position with the key 48, the security device 20 cannot be unscrewed, disconnected or removed from the port 26. Any attempt to remove, bypass or defeat the security device 20 by turning the security device 20 while in the secured position will result in the outer body 42 and the free spinning cover 40 freely rotating relative to the inner body 50 of the security device 20. Accordingly, because the inner body 50 remains connected to the port 26, the security device 20 cannot be disconnected from the port 26.

When the security device 20 is configured in the unsecured position with the key 48, the outer body 42 operatively engages the inner body 50. Accordingly, movement of the outer body 42, as may be by rotation, moves likewise the inner body 50 about the port 26, thereby removing the security device 20 from the port 26.

Figures 2, 3:
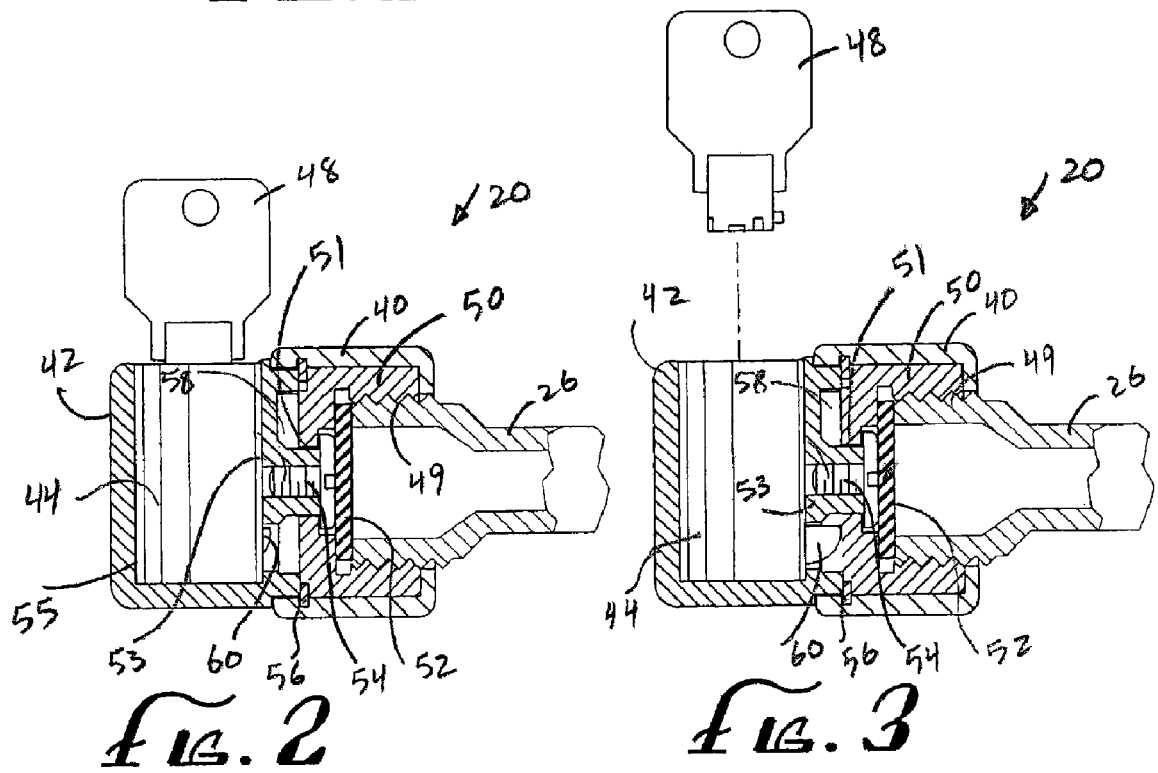
FIG. 2 is a cross sectional view of the security device of FIG. 1 taken at sectional line 2-2 of FIG. 1 and shown in the secured position.
FIG. 3 is a cross sectional view of the security device of FIG. 1 shown in the unsecured position.

Referring to FIGS. 2-4, the security device 20 is shown in more detail. The inner body 50 (shown upside down in FIG. 4) may be a generally annular structural configuration. In one embodiment, the inner body 50 connects to the port 26 by having threads formed on an inner surface thereof that engage a complimentary counter-threaded outer rim 49 of the port 26. It is within the teachings of the present disclosure that other methods may be used to connect the inner body 50 to the port 26. One of skill in the art will recognize that other similar or like connection or fastening configurations may be used with corresponding success as described herein.

A sealing element 52 may be disposed between the port 26 and the inner body 50 to form a seal between the inner body 50 and the port 26, thereby preventing any fluid, i.e., liquid or gas, from entering the security device 20. The sealing element 52 may be formed from any suitable material. For example, in one embodiment the sealing element may be a rubber disc. It is within the teachings of the present disclosure that the sealing element may be formed from plastics, synthetic materials, natural materials, metal, or any other suitable material.

The inner body 50 includes a bore 51 for receiving a correspondingly dimensioned generally hollow cylindrical extension 53 of the outer body 42. In one embodiment, the bore 51 is generally centrally disposed in an outer end of the inner body 50. The extension 53 is internally threaded in one embodiment so as to receive a threaded fastener 54. It is within the teachings of the present disclosure that the extension and fastener may be configured in any other suitable complimentary manner to provide the indicated functionality. The fastener 54 engages the outer body 42 and the inner body 50 so as to permit relative rotational movement there between and to prevent separation or unintended disassembly of the outer body 42 from the inner body 50.

A fastener 56 may be used to connect the cover 40 to the inner body 50. Preferably, the fastener 56 facilitates free rotation of the free spinning cover 40 relative to the inner body 50, yet the cover 40 cannot be removed from the inner body 50 by tools, such as pliers or wrenches. In one embodiment of the present disclosure, the fastener 56 may be configured as a snap or "C"-ring that has an at-rest diameter larger than the groove formed in the inner surface of the cover 40. Accordingly, such a snap or "C"-ring is under tension when installed within the groove. Those of skill in the art will recognize that other suitable fasteners may be used to achieve the same functionality and are within the teachings of the present disclosure. Preferably, in one embodiment, the fastener 56 is disposed in the groove and engages an outer end of the inner body 50 and an inner end of the outer body 42 such that an inner end of the cover 40 engages a shoulder of the outer body 42 and presents no discernable edge for manipulation by a tool or other instrument.

The outer body 42 is preferably generally cylindrical and, in one embodiment, includes a blind bore 55 extending transversely therein. The lock 44 is configured to engage the blind bore 55. The lock 44 includes a lock plug 60 that is movable between an extended position (See FIG. 3) and a retracted position (See FIG. 2), both by actuation with the key 48. In other words, turning the key 48 while properly engaged in the lock 44 provides extension and retraction of the lock plug 60. Preferably, the lock plug 60 is normally biased in the extended position. Such biasing may be provided by any suitable structure, device or mechanism. Preferably, the lock plug 60 is spring biased. One of ordinary skill in the art will recognize numerous methods by which such an extension and retraction of the lock plug 60 with the key 48 may be accomplished. For example, a rotatable cam (not shown) can engage the lock plug 60 to provide the noted extension and retraction function. The cam can be rotatable with the key 48. The lock 44 is disposed in an extended configuration when the plug 60 is disposed in an extended position and is disposed in a retracted configuration when the plug 60 is disposed in a retracted position.

In the secure position (as shown in FIG. 2), the lock plug 60 is disposed in the retracted position into the lock 44. In the unsecured position (as shown in FIG. 3), the lock plug 60 extends outwardly in the extended position from the side of the lock 44 through an opening 57 (shown in FIG. 3) in the outer body 42 and engages a recess 58 formed on an outer end surface of the inner body 50. Accordingly, in the unsecured position, the outer body 42, as a result of the extended plug 60, engages the recess 58 of the inner body 50 so that any rotation of the outer body 42 also causes a rotation of the inner body 50. In the secure position, however, the lock plug 60 is retracted inside the lock 44 and out of engagement with the recess 58. Accordingly, the outer body 42 is free to rotate relative to the inner body 50. Therefore, any rotation of the outer body 42 will not cause a rotation of the inner body 50. To prevent access to the inner body 50 when the security device 20 is in the secure position, the free-spinning cover 40 is freely rotatably mounted to the inner body 50, as described in more detail above. Accordingly, the free-spinning cover 40 can freely rotate relative to the inner body 50 regardless of whether the lock 44 is in the extended configuration or the retracted configuration as a result of the connection of the inner body 50 with the fastener 56 as described in the foregoing.

The security device 20 prevents unauthorized use of the hose bib 21 by preventing access to the port 26. To lock the hose bib 21 with the security device 20, a user can confirm that the security device 20 is disposed in the unsecured position and screw fasten the security device 20 onto the port 26 by having the inner threads of the inner body 50 engage the outer threads of the port 26 until the sealing element 52 is slightly compressed, if in use. In the event the security device 20 is in the secure position but not installed, the user may insert the key 48 to actuate the lock 44 and corresponding lock plug 60 such that the lock plug 60 extends to automatically engage the recess 58. There is no requirement that the recess 58 and lock plug 60 be aligned in registration prior to actuation of the lock 44 because the security device 20 automatically aligns. After the lock plug 60 has been actuated by the key 48 to the extended position, but is not in alignment with the recess 58, the user only needs to rotate the outer body 42 relative to the inner body 50 and the lock plug 60 will automatically engage the recess 58 when they are disposed in aligned registration.

Once the inner body 50 is connected to the port 26, however, the security device 20 is not yet in the secure position so as to prevent access to the port 26. As described in the foregoing, when the lock is in the unsecured position, the lock plug 60 extends outwardly from the lock 44 to engage the recess or slot 58 of the inner body 50. Therefore, any rotation of the outer body 42 causes the rotation of the inner body 50, and the security device 20 can be simply unscrewed from the port 26.

To place the security device 20 in the secure position, the user can turn the key 48 so that the lock plug 60 is retracted inside the lock 44. Accordingly, the outer body 42 can freely rotate relative to the inner body 50. If an unauthorized user tries to remove the security device 20 by simply rotating the security device 20 to unscrew the security device 20 from the port 26, both the outer body 42 and the free spinning cover 40 would freely spin relative to the inner body 50. Accordingly, the rotation of the outer body 42 and/or the rotation of the free spinning cover 40 will not cause the inner body 50 to rotate relative to the port 26 so as to be unscrewed from the port 26.

Referring to FIG. 1, the security device 20 can also be attached to the valve stem 30 to prevent operation of the valve 28 or hose bib 21. By removing the handle 32 from the valve stem 30, the threaded portion (not shown) of the valve stem 30 to which the handle 32 can be attached will be exposed to provide connection of the inner body 50 thereto. When the security device 20 is connected to the valve stem 30 and is placed in the unsecured position, rotation of the outer body 42 will cause rotation of the inner body 50 to operate the ball valve 28. Accordingly, when the security device 20 is in the unlocked position, rotating the outer body 42 can provide the open and close operation of the ball valve 28.

When the security device 20 is placed in the secure position, any attempt by an unauthorized user to operate the ball valve 28 with the security device 20 will cause the free rotation of the outer body 42 and the free spinning cover 40 about the valve stem 30. Accordingly, when the security device 20 is secure, an unauthorized user cannot access water from the hose bib 21.

The security device 20 can be attached to any type of apparatus, device, assembly or other structure with a threaded element. For example, the security device 20 can be sized and configured for attachment to any type of beverage container such as a liquor bottle (not shown), or other like containers. Accordingly, the security device 20 can prevent unauthorized access to the liquor that is in the respective bottle. Such unauthorized access may be necessary to keep underage persons from the liquor while no parents are present, unauthorized persons from accessing the liquor or wine in a bar or restaurant, or to protect expensive or rare bottles of wine. In another example, the security device 20 can be used on containers, vessels, tanks or bottles that contain hazardous chemicals. The container (not shown) may contain a hazardous chemical that is to be accessed by authorized users who know how to safely handle the chemical. Accordingly, the security device 20 can prevent unauthorized access to the contents of the container. Although bottles and containers are used herein as examples of fluid sources having ports to access the fluids, one of ordinary skill in the art will readily appreciate that the security device 20 can be sized and configured to prevent access to any storage container and/or fluid supply line that includes an outer or inner threaded element which can connect to the security device 20. Those of skill in the art will recognize that the security device 20 may be used in connection with any port that has internal threads. For example, chemical containers often have such internally threaded ports as do test cock valves on backflow testing systems. It is within the teachings of this disclosure that the security device 20 may be reconfigured dimensionally to provide the intended function in connection with any such threaded port.

The security device 20 can be constructed from a number of materials depending on the application for which the security device 20 is used. For example, a security device 20 that is constructed for use with the hose bib 21, as described in the foregoing, may be constructed from the same materials as the hose bib 21. Such materials any type of metallic materials such as brass, copper, steel, or the like and alloys thereof to prevent corrosion and increase longevity because the hose bib 21 may be exposed to outdoor environment. The security device 20 may also be constructed from other materials that provide corrosion and weather resistance, for example, synthetic, natural or plastic materials. Furthermore, the security device 20 may be constructed with materials that are not easily breakable or not susceptible to an unauthorized user who may attempt to use excessive force to break the security device 20. For applications where the security device 20 is used indoors, such as the foregoing described application of using the security device 20 for liquor or wine bottles, the security device 20 may be constructed from hard plastics so as to be lightweight and easy to mass manufacture. The components of the security device 20 may be constructed from a variety of different materials and not simply one or two materials. For example, the knurled body and the free spinning body may be constructed from plastics so as to provide better weather resistance for outdoor applications. However, the slotted inner body and the truss-head screw may be constructed from a variety of metals.

While the particular preferred embodiments have been shown and described, it will be obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective based on the related art.

What is claimed is:

1. A security device for a threaded element, the security device comprising:
   an inner body configured to engage the threaded element;
   an outer body coupled as a linear extension to the inner body;
   a cover disposed over, radial to and freely moveable relative to the inner body and the outer body, and
   a lock disposed within the outer body, the lock including a plug moveable from an extended position to a retracted position and the security device operable between an unsecured configuration, defined as when the plug is disposed in the extended position, and a secured configuration, defined as when the plug is disposed in a refracted position;
   wherein the outer body and the inner body are operatively coupled for movement when the security device is disposed in the unsecured configuration; and
   wherein the outer body is freely rotatable separate from the inner body when the lock is disposed in the secured configuration.

2. The security device as recited in claim 1, wherein a fastener engages an inner surface of the cover retaining the inner body within the freely moveable cover.

3. The security device as recited in claim 1, further comprising a sealing element disposed between the inner body and the threaded element.

4. The security device as recited in claim 1, wherein the inner body comprises a threaded portion complimentary to the threaded element.

5. The security device as recited in claim 1, wherein the lock is disposed in a bore formed in the outer body.

6. The security device as recited in claim 1, wherein the inner body includes a recess defined on an outer surface adjacent the outer body.

7. The security device as recited in claim 1, wherein the plug disposed in the extended position engages a recess on an outer surface of the inner body.

8. The security device as recited in claim 7, wherein the outer body includes an extension that operatively engages a bore defined in the inner body.

9. The security device as recited in claim 8, further comprising a fastener which engages the extension and the inner body.

10. The security device as recited in claim 7, wherein the outer body includes a opening through which the plug extends when the security device is disposed in the unsecured position.

11. The security device as recited in claim 1, wherein the outer body includes a knurled outer surface.

12. The security device as recited in claim 1, wherein the lock is removable from the outer body.

13. The security device as recited in claim 1, wherein the outer body includes a shoulder that engages an outer end of the cover.

14. The security device as recited in claim 1, wherein the lock includes a plug, wherein when the plug is disposed in the extended position the outer body can be moved relative to the inner body, to engage the plug into a recess defined on an outer surface of the inner body.

15. A security device for a threaded element, the security device comprising:

an inner body configured to engage the threaded element;

an outer body coupled as a linear extension to the inner body;

a cover disposed over, radial to and freely moveable relative to the inner body and outer body, and a lock disposed within the outer body, the lock including a plug moveable from an extended position to a retracted position and the security device operable between an unsecured configuration, defined as when the plug is disposed in the extended position, and a secured configuration, defined as when the plug is disposed in a retracted position;

wherein the outer body and the inner body are operatively coupled for movement when the security device is disposed in the unsecured configuration; and wherein the outer body is freely rotatable separate from the inner body when the lock is disposed in the secured configuration wherein the threaded element is a port for a fluid passageway.

16. A security device for a threaded element, the security device comprising:

an inner body configured to engage the threaded element;

an outer body coupled as a linear extension to the inner body;

a cover disposed over, radial to and freely moveable relative to the inner body an the outer body, and a lock disposed within the outer body, the lock including a plug moveable from an extended position to a retracted position and the security device operable between an unsecured configuration, defined as when the plug is disposed in the extended position, and a secured configuration, defined as when the plug is disposed in a refracted position;

wherein the outer body and the inner body are operatively coupled for movement when the security device is disposed in the unsecured configuration; and wherein the outer body is freely rotatable separate from the inner body when the lock is disposed in the secured configuration wherein the threaded element is a control.

* * * * *